United States Patent [19]

Asano et al.

[11] Patent Number: 5,160,475
[45] Date of Patent: Nov. 3, 1992

[54] METHOD OF PRODUCING SHAPED ARTICLES HAVING EXCELLENT IMPACT RESISTANCE

[75] Inventors: Kuniyoshi Asano, Hirakata; Tomoyoshi Uemura, Ibaraki; Hiroshi Takida, Takatsuki, all of Japan

[73] Assignee: Nippon Gohsei Kagaku Kogyo Kabushiki Kaisha, Osaka, Japan

[21] Appl. No.: 648,699

[22] Filed: Jan. 31, 1991

[30] Foreign Application Priority Data

Feb. 1, 1990 [JP] Japan ................... 2-23020
Oct. 29, 1990 [JP] Japan ................... 2-293075

[51] Int. Cl.⁵ ............... B29K 96/02; C08G 81/02; C08L 23/00
[52] U.S. Cl. ............. 264/331.170; 264/331.19; 264/331.21; 264/328.1; 264/349; 525/74; 525/183; 525/240
[58] Field of Search ............. 264/331.19, 331.15, 264/512, 211, 209.1, 349, 171, 173, 513, 514, 515, 328.1, 331.17, 331.18, 331.21; 525/240, 74, 178, 179, 183, 78

[56] References Cited

U.S. PATENT DOCUMENTS

| 3,373,223 | 3/1968 | Armstrong | 525/183 |
|---|---|---|---|
| 3,375,300 | 3/1968 | Ropp | 525/74 |
| 3,644,571 | 2/1972 | Anderson et al. | 525/183 |
| 3,975,463 | 8/1976 | Hirata et al. | |
| 4,058,647 | 11/1977 | Inoue et al. | |
| 4,261,473 | 4/1981 | Yamada et al. | 264/512 |
| 4,370,388 | 1/1983 | Mito et al. | |
| 4,444,817 | 4/1984 | Subramanian | 264/171 |
| 4,472,555 | 9/1984 | Schmukler et al. | 525/240 |
| 4,532,100 | 7/1985 | Lancaster et al. | 264/171 |
| 4,552,714 | 11/1985 | Krueger et al. | 264/171 |
| 4,594,386 | 6/1986 | Olivier | |
| 4,600,746 | 7/1986 | Schmukler et al. | 264/331.15 |
| 4,613,644 | 9/1986 | Moritani | |
| 4,668,571 | 5/1987 | Moriarity, Jr. | 264/171 |
| 4,675,356 | 6/1987 | Miyata | |
| 4,704,423 | 11/1987 | Iwanami et al. | |
| 4,758,477 | 7/1988 | Okano et al. | |
| 4,795,781 | 4/1989 | Miyamoto et al. | |
| 4,864,002 | 9/1989 | Scheutz et al. | 525/240 |
| 4,904,723 | 2/1990 | Uemura et al. | |
| 4,910,254 | 3/1990 | Johnston | 525/240 |
| 4,950,513 | 8/1990 | Mehra | 264/515 |
| 4,962,148 | 10/1990 | Orikasa et al. | |
| 4,963,608 | 10/1990 | Kunieda et al. | |
| 5,085,816 | 2/1992 | McCord | 264/515 |

FOREIGN PATENT DOCUMENTS

31708/89 9/1989 Australia .
0342066 11/1989 European Pat. Off. .

Primary Examiner—Jeffery Thurlow
Assistant Examiner—Mathieu Vargot
Attorney, Agent, or Firm—Armstrong, Nikaido, Marmelstein, Kubovcik & Murray

[57] ABSTRACT

A method of producing shaped articles having excellent impact resistance which includes melt-molding a composition derived from a saponified ethylene-vinyl acetate copolymer (A) by incorporating therein an ethylene-propylene copolymer elastomer (B) and a graft polymer (C) obtained by grafting an ethylenically unsaturated carboxylic acid or a derivative thereof to a polyolefin resin and reacting the resulting grafting product further with a polyamide oligomer or polyamide.

1 Claim, No Drawings

METHOD OF PRODUCING SHAPED ARTICLES HAVING EXCELLENT IMPACT RESISTANCE

BACKGROUND OF THE INVENTION

1. Industrial Field of Utilization

The present invention relates to a method of producing shaped articles of high quality by melt-molding a composition comprising a saponified ethylenevinyl acetate copolymer and an ethylene-propylene copolymer elastomer incorporated in said saponified copolymer.

2. Prior Art

Saponified ethylene-vinyl acetate copolymers are much superior in rigidity, hardness, wear resistance, antistatic property and other aspects to other resins for molding but have a drawback that their impact resistance is not satisfactory.

To cope with such drawback, measures have been taken which consist of incorporation into said saponified copolymers synthetic resins, such as styrenebutadiene copolymer and acrylonitrile-butadiene copolymer, polyester elastomers, thermoplastic urethane resins, and ethylene copolymers.

3. Problems Which the Invention is to Solve

However, the prior art measures are not always satisfactory from the impact resistance-improving effect viewpoint. For instance, when synthetic rubbers are used, they may undergo thermal degradation during molding or give shaped articles with insufficient weather resistance. When polyester elastomers are used, the shaped articles may encounter chemical resistance problems.

Furthermore, thermoplastic urethanes are disadvantageous in that they cause marked viscosity increases during molding. Ethylene copolymers are unsatisfactory in long-run moldability. Thus, at present, no prior art method can improve the impact resistance of said saponified copolymers to a satisfactory extent.

SUMMARY OF THE INVENTION

As a result of their intensive investigations to solve such problems, the present inventors found that the objects of the invention can be accomplished when a composition derived from a saponified ethylene-vinyl acetate copolymer (A) by incorporating therein an ethylene-propylene copolymer elastomer (B) and a graft polymer (C) obtained by grafting an ethylenically unsaturated carboxylic acid or a derivative thereof to a polyolefin resin and reacting the resulting grafting product further with a polyamide oligomer or polyamide is melt-molded. The present invention has been completed based on this and other findings.

DETAILED DESCRIPTION OF THE INVENTION

The saponified ethylene-vinyl acetate copolymer (A) to be employed in accordance with the present invention should have an ethylene content of 20 to 60 mole %, preferably 25 to 55 mole %, with a degree of saponification of its vinyl acetate component being not less than 95 mole %.

With an ethylene content less than 20 mole %, the water resistance is not as high as desired, while an ethylene content in excess of 60 mole % leads to decreases in rigidity, wear resistance and other physical properties. When the degree of saponification or hydrolysis is less than 95 mole %, the rigidity, hardness and water resistance are sacrificed.

It should be understood that this saponified copolymer may contain small proportions of other comonomer ingredients including $\alpha$-olefins such as propylene, isobutene, $\alpha$-octene, $\alpha$-dodecene, $\alpha$-octadecene, etc., unsaturated carboxylic acids or salts thereof, partial alkyl esters, complete alkyl esters, nitriles, amides and anhydrides of such acids, and unsaturated sulfonic acids or salts thereof.

The ethylene-propylene copolymer elastomer (B) is a copolymer elastomer with an ethylene content of 30 to 90 weight % and those species that have a density of about 0.85 to 0.87 g/cm$^3$ and a glass transition point within the range of $-50°$ C. to $-60°$ C. are suited for use in most cases.

It is also possible to use a terpolymer produced by copolymerization of ethylene, propylene and a diene monomer (third component).

For improving the compatibility between (A) and (B), incorporation of component (C) is essential in the practice of the invention.

The component (C) is a graft polymer obtainable by grafting an ethylenically unsaturated carboxylic acid or a derivative thereof to a polyolefin resin and reacting this carboxylic acid or derivative thereof with a polyamide oligomer or polyamide.

This graft polymer can be produced by dissolving or suspending a polyolefin resin in an appropriate solvent or putting it in a molten state, activating the polyolefin resin chain with a peroxide or diazo initiator, grafting an ethylenically unsaturated carboxylic acid or a derivative thereof thereto to give a polymer and mixing this polymer with a polyamide oligomer or polyamide in molten state.

For this reaction a, Brabender machine, Buss blender, single-screw extruder, Werner and Pfleiderer twin-screw extruder or the like is employed.

The degree of polymerization of the polyolefin resin to be employed is about 350 to 45,000 and preferably about 500 to 1,000. The melt flow rate (230° C., load 2160 g; the same applies hereinafter) is about 0.1 to 50 g/10 minutes for all practical purposes.

The reaction ratio of the polyolefin resin to the ethylenically unsaturated carboxylic acid or a derivative thereof is 100/0.05 through 100/10 and preferably 100/0.05 through 100/3 as expressed on the weight basis.

If the ratio is 100/less than 0.05, the improving effect on compatibility will not be sufficient. On the other hand, if the ratio is 100/more than 10, the viscosity will be too high for practical molding.

The degree of polymerization of said polyamide oligomer is 5 to 80, preferably not less than 15, and the degree of polymerization of said polyamide is 80 to 1000, preferably not more than 500, for all practical purposes and the reaction ratio is 0.01 to 1 mole and preferably 0.05 to 0.9 mole per mole of the carboxyl group.

As examples of the polyolefin resin, there may be mentioned linear low-density, medium-density or high-density polyethylene, ionomers, ethylene-propylene copolymer, ethylene-acrylic ester copolymer, ethylenevinyl acetate copolymer and so on. Important for practical purposes are linear low-density polyethylene, low-density polyethylene, ethylene-propylene copolymer and ethylene-vinyl acetate copolymer.

The ethylenically unsaturated carboxylic acid or derivative thereof to be grafted to such a trunk polymer includes, among others, unsaturated carboxylic acids such as acrylic acid, methacrylic acid, crotonic acid, maleic acid, fumaric acid and itaconic acid, and the corresponding anhydrides or half esters.

The polyamide oligomer or polyamide can be prepared by the known methods such as addition polymerization of a lactam, polycondensation of an aminocarboxylic acid, polycondensation of a diamine with a dicarboxylic acid, and so on.

Examples of the starting materials for said polyamide oligomer or polyamide are various lactams such as ε-caprolactam, enantholactam, caprylolactam, laurolactam, α-pyrrolidone, α-piperidone, etc., ω-amino acids such as 6-aminocaproic acid, 7-aminoheptanoic acid, 9-aminononanoic acid, 11-aminoundecanoic acid, etc., dibasic acids such as adipic acid, glutaric acid, pimellic acid, suberic acid, azelaic acid, sebacic acid, undecadioic acid, dodecadioic acid, hexadecadioic acid, hexadecenedioic acid, eicosadioic acid, eicosadienedioic acid, diglycolic acid, 2,2,4-trimethyladipic acid, xylylenedicarboxylic acid, 1,4-cyclohexanedicarboxylic acid, terephthalic acid, isophthalic acid, etc., and diamines such as hexamethylenediamine, tetramethylenediamine, nonamethylenediamine, undecamethylenediamine, dodecamethylenediamine, 2,2,4- (or 2,4,4-)trimethylhexamethylenediamine, bis(4,4'-aminocyclohexyl)methane, metaxylylenediamine and so on. For molecular weight control, a monoamine such as laurylamine or oleylamine can also be used in an appropriate amount.

In the composition of the present invention, the proportion of (A) should be 50 to 99.5 weight % and preferably 60 to 95 weight %, that of (B) should be 0.4 to 50 weight % and preferably 4.5 to 35 weight %, and that of (C) should be 0.1 to 15 weight % and preferably 0.5 to 10 weight %.

When the proportion of (A) is less than 50 weight % or that of (B) is over 50 weight %, the rigidity, hardness and wear resistance are adversely affected. Conversely when the proportion of (A) is over 99.5 weight % or that of (B) is less than 0.4 weight %, the impact resistance-improving effect will not be sufficient. When the proportion of (C) is less than 0.1 weight %, the compatibility between (A) and (B) is poor, so that the impact resistance-improving effect decreases. Conversely when the proportion of (C) exceeds 15 weight %, the long-run moldability is adversely affected.

The composition mentioned above is subjected, as such, to molding into desired shaped articles or is preliminarily pelletized and then molded into desired shaped articles.

The method of melt-molding is not limited to any particular technique but may included injection molding, extrusion molding, compression molding, rotary molding, blow molding, fluidized bed dipping and so forth.

The temperature of the molten resin should recommendably be in the range of about 170° to 260° C. so that the resin can retain an adequate flowability and at the same time thermal degradation can be avoided. In melt-molding, it is possible to incorporate, if necessary, known additives, such as a stabilizer, plasticizer, filler, colorant, foaming agent, builder, etc., and/or known reinforcements, such as glass fiber, carbon fiber and so on into the composition according to the invention.

The shaped articles obtained by the method mentioned above can be used in various fields of application, for example, as parts in general machines, apparatus or appliances, parts in automobiles, ships or aircraft, parts in optical or chronographic instruments, parts in electric appliances and so forth.

In addition, the shaped articles according to the invention are useful as packaging materials, such as sheets, films and bottles. In such use, the oxygen barrier property of the saponified ethylene-vinyl acetate copolymer can be exhibited as a characteristic property.

In such use, the shaped articles according to the invention are used not only in the form of single layer shaped articles but also in the form of laminates in combination with various thermoplastic resins such as polyolefins, polyesters, nylons and so on. The shaped articles may be stretched uniaxially or biaxially for practical use thereof, as necessary.

EFFECTS

Shaped articles produced from the composition comprising (A), (B) and (C) according to the invention have markedly improved impact resistance without the moldability of the saponified ethylene-vinyl acetate copolymer or the appearance and other aspects of shaped articles being impaired to any substantial extent.

EXAMPLES

The following examples are further illustrative of the composition of the present invention. In the following description, all parts and % are by weight unless otherwise indicated.

| Preparation of samples | | | | |
|---|---|---|---|---|
| | Saponified ethylene-vinyl acetate copolymer | | | |
| Sample | E-1 | E-2 | E-3 | E-4 |
| Ethylene content (mole %) | 30 | 34 | 40 | 45 |
| Degree of saponification of vinyl acetate component (mole %) | 99.7 | 99.4 | 99.2 | 99.7 |

| Ethylene-propylene copolymer elastomer | | | |
|---|---|---|---|
| | Sample | Density (g/cm$^3$) | Glass transition point |
| P-1 | Ethylene-propylene copolymer elastomer with ethylene content 50% | 0.86 | −55 |
| P-2 | Ethylene-propylene copolymer elastomer with ethylene content 67% | 0.87 | −52 |

-continued

Preparation of samples

| Sample | Graft polymer | | | |
|---|---|---|---|---|
| | G-1 | G-2 | G-3 | G-4 |
| Trunk polymer (a) | Linear low-density polyethylene | Linear polyethylene | Ethylene-vinyl acetate copolymer with vinyl acetate content 12% | Ethylene-propylene copolymer with ethylene content 12% |
| MFR (g/10 min.) | (12.5) | (7.8) | (4.5) | (8.0) |
| Unsaturated carboxylic acid (b) | Maleic anhydride | Maleic anhydride | Maleic anhydride | Maleic anhydride |
| Polyamide oligomer (c) | ε-Caprolactam oligomer (P̄:25) | ε-Caprolactam oligomer (P̄:40) | Hexamethylene-diamine/adipic acid oligomer (P̄:24) | ε-Caprolactam oligomer (P̄:24) |
| Composition ratio | (a)/(b) (weight ratio) | 100/2.1 | 100/2.5 | 100/1.8 | 100/2.9 |
| | (c)/(b) (mole ratio) | 1/2 | 2/2.5 | 1.4/1.8 | 0.9/2.9 |

EXAMPLES 1 THROUGH 10 AND COMPARATIVE EXAMPLES 1 AND 2

The compositions of (A), (B) and (C) as specified in Table 1 were each mixed well in a powder form in a Henschel mixer, then dried in a hot-air drying chamber and fed to an injection molding machine (shot weight 3.5 ounces) for injection molding under the following molding conditions: nozzle temperature 220° C., front temperature 200° C., rear temperature 22° C., mold temperature 60° C., injection pressure 1,200 kg/cm² and cycle 35 seconds.

The test specimens thus obtained were measured for their physical properties. The results are set forth in Table 1.

TABLE 1

| | Material | Blending ratio E/P/G | Izod impact strength | |
|---|---|---|---|---|
| | | | Notched (kg · cm/cm) | Unnotched (Note 2) |
| Example | | | | |
| 1 | E-1 P-1 G-1 | 75/20/5 | 7.5 | 20/20 |
| 2 | E-2 P-2 G-2 | 65/25/10 | 8.0 | 20/20 |
| 3 | E-3 P-1 G-3 | 80/10/10 | 8.5 | 20/20 |
| 4 | E-4 P-2 G-1 | 60/30/10 | 8.5 | 20/20 |
| 5 | E-1 P-1 G-4 | 80/15/5 | 7.5 | 20/20 |
| 6 | E-1 | 90/8/2 | 6.4 | 18/20 |

TABLE 1-continued

| | Material | Blending ratio E/P/G | Izod impact strength | |
|---|---|---|---|---|
| | | | Notched (kg · cm/cm) | Unnotched (Note 2) |
| 7 | P-2 G-1 E-1 | 45/40/15 | 8.5 | 16/20 |
| 8 | P-2 G-1 E-2 | 90/2/8 | 6.2 | 18/20 |
| 9 | P-1 G-2 E-1 | 75/10/15 | 6.5 | 18/20 |
| 10 | P-1 G-1 E-4 | 94.5/5/0.5 | 6.4 | 17/20 |
| Comparative Example | P-2 G-3 | | | |
| 1 | E-1 | 100 | 3.6 | 1/20 |
| 2 | E-1 P-1 | 74/26 | 3.2 | 4/20 |

Note 1) Impact strength measurements were made after maintaining the test specimens in an absolute dry condition at 20° C. according to ASTM 0256.
Note 2) Number of survivals/number of tests.

EXAMPLES 11 THROUGH 20 AND CONTROL EXAMPLES 3 AND 4

Using the following graft polymer, extrusion molding was conducted in the same manner as Examples 1 through 10.

The test specimens thus obtained were measured for their physical properties. The results are set forth in Table 2.

| Sample | G-5 | G-6 | G-7 | G-8 |
|---|---|---|---|---|
| Trunk polymer (a) | Linear low-density polyethylene | Linear polyethylene | Ethylene-vinyl acetate copolymer with vinyl acetate content 12% | Ethylene-propylene copolymer with ethylene content 12% |
| MFR (g/10 min.) | (12.5) | (7.8) | (4.5) | (8.0) |
| Unsaturated carboxylic acid (b) | Maleic anhydride | Maleic anhydride | Maleic anhydride | Maleic anhydride |
| Polyamide (c) | ε-Caprolactam type (P̄:250) | ε-Caprolactam type (P̄:400) | Hexamethylene-diamine/adipic acid type (P̄:150) | ε-Caprolactam type (P̄:500) |

-continued

| Sample | | G-5 | G-6 | G-7 | G-8 |
|---|---|---|---|---|---|
| Composition ratio | (a)/(b) (weight ratio) | 100/2.1 | 100/2 | 100/1.8 | 100/2.9 |
| | (c)/(b) (mole ratio) | 1/2 | 2/2 | 1.4/1.8 | 0.9/2.9 |

TABLE 2

| | | Blending ratio | Izod impact strength | |
|---|---|---|---|---|
| | Material | E/P/G | Notched (kg · cm/cm) | Unnotched (Note 2) |
| Example | | | | |
| 11 | E-1 P-1 G-5 | 75/20/5 | 7.0 | 20/20 |
| 12 | E-2 P-2 G-6 | 65/25/10 | 8.0 | 20/20 |
| 13 | E-3 P-1 G-7 | 80/10/10 | 7.5 | 20/20 |
| 14 | E-4 P-2 G-5 | 60/30/10 | 8.0 | 20/20 |
| 15 | E-1 P-1 G-8 | 80/15/5 | 8.5 | 20/20 |
| 16 | E-1 P-2 G-5 | 90/8/2 | 6.5 | 19/20 |
| 17 | E-1 P-2 G-5 | 45/40/15 | 8.8 | 18/20 |
| 18 | E-2 P-1 G-6 | 90/2/8 | 6.0 | 19/20 |
| 19 | E-1 P-1 G-5 | 75/10/15 | 6.3 | 20/20 |
| 20 | E-4 P-2 G-7 | 94.5/5/0.5 | 6.0 | 16/20 |
| Comparative Example | | | | |
| 3 | E-1 | 100 | 3.6 | 1/20 |

TABLE 2-continued

| | | Blending ratio | Izod impact strength | |
|---|---|---|---|---|
| | Material | E/P/G | Notched (kg · cm/cm) | Unnotched (Note 2) |
| 4 | E-1 P-1 | 74/26 | 3.2 | 4/20 |

What is claimed is:

1. A method of producing shaped articles having excellent impact resistance which comprises melt-molding a composition derived from
a saponified ethylene-vinyl acetate copolymer (A) with an ethylene content of 20 to 60 mole % and a degree of saponification of its vinyl acetate component being not less than 95 mole % by incorporating therein
an ethylene-propylene copolymer elastomer (B) with an ethylene content of 30 to 90 weight % and having a density of 0.85 to 0.87 g/cm$_3$ and a glass transition point within the range of −50° C. to −60° C, and
a graft polymer (C) obtained by grafting 0.05 to 10 parts by weight of an ethylenically unsaturated carboxylic acid or derivative thereof to 100 parts by weight of a polyolefin resin to produce a grafted product and reacting the resulting product further with a polyamide having a degree of polymerization of 150 to 500, where the reaction ratio of the polyamide to the grafted product is 0.01 to 1 mole per mole of carboxyl group of the grafted product by mixing the grafted product and the polyamide while in a molten state,
wherein the proportion in the composition of the saponified ethylene-vinyl acetate copolymer (A) is 60 to 80 weight %, the proportion of the elastomer (B) is 10 to 30 weight %, and the proportion of the graft polymer (C) is 5 to 10 weight %.

* * * * *